April 21, 1931. D. H. SCHWEYER 1,801,882
INDUCTION TRAIN CONTROL APPARATUS
Filed Aug. 21, 1928    2 Sheets-Sheet 2
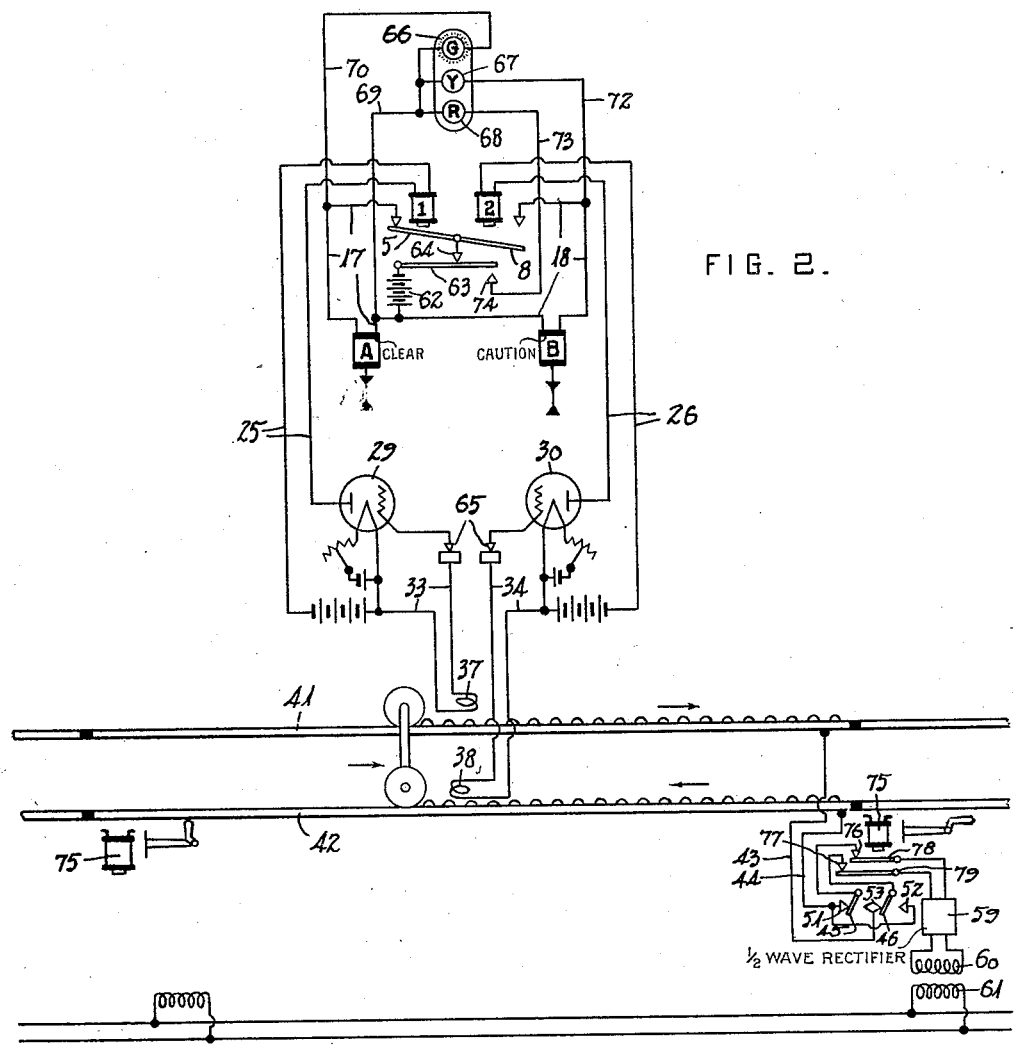

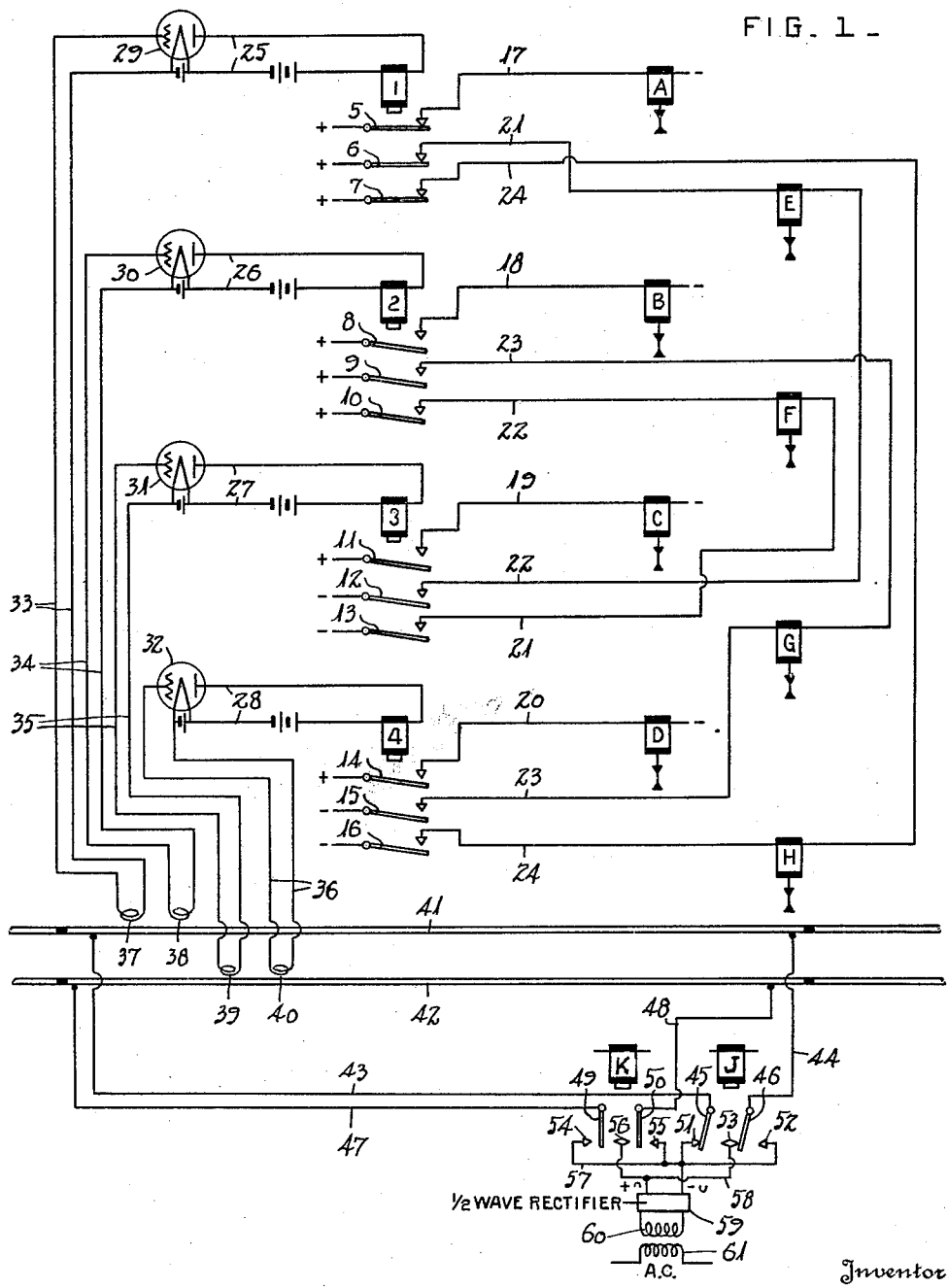

Patented Apr. 21, 1931

1,801,882

UNITED STATES PATENT OFFICE

DANIEL HERBERT SCHWEYER, OF EASTON, PENNSYLVANIA

INDUCTION TRAIN-CONTROL APPARATUS

Application filed August 21, 1928. Serial No. 301,021.

The present invention relates to inductive train control apparatus, and aims to provide novel and improved means for inductively transmitting various controlling conditions from the trackside to a train or vehicle travelling thereover, the improvements being particularly intended for continuous control although being useful also for intermittent control.

Another object of the invention is the provision of a method and apparatus of the character indicated by means of which a variety of different vehicle controlling conditions may be employed, and using the two traffic rails of a railroad track, with the same frequency of inducing current and not more than one current in either rail, it is possible to obtain nine different vehicle controlling conditions.

A further object of the invention is the provision of an apparatus of the nature indicated which is simple in construction and efficient in operation, without involving complicated devices that are apt to cause trouble.

It is also an object of the invention to provide inductive train control apparatus which is not apt to be disturbed by stray currents in the traffic rails.

With the foregoing and other objects in view, which will be apparent as the invention is more fully understood, the invention resides in the method and apparatus as hereinafter described and claimed, it being noted that changes can be made within the scope of what is claimed, without departing from the spirit of the invention.

The invention is illustrated in the accompanying drawings, wherein—

Figure 1 is a diagrammatical view of the apparatus for nine vehicle condition control.

Fig. 2 is a diagrammatical view of a modified form of apparatus for three vehicle condition control.

Referring to Fig. 1, the vehicle equipment embodies electromagnets or solenoids A, B, C, D, E, F, G and H, or other suitable translating devices, which may control the air brakes or other mechanism, in order to obtain various vehicle controlling conditions, or said elements may control suitable signals for indicating the various conditions.

For example, when the solenoid A alone is energized this may provide for clear conditions and unrestricted speed of the vehicle; when the solenoid B alone is energized the speed of the vehicle is to be restricted below seventy miles per hour; when the solenoid C alone is energized the speed of the vehicle is restricted below sixty miles per hour; and for the succeeding solenoids the speed of the vehicle may be reduced in proportion until the energization of the solenoid H alone provides for a vehicle speed restricted to less than ten miles per hour, while deenergization of all of the solenoids provides for danger conditions. Various other combinations of controlling conditions may be employed, and the solenoids or equivalent translating devices may control the air brakes, signals, or other equipment, for a variety of conditions.

The solenoids are controlled by the relays 1, 2, 3 and 4. The relay 1 has the switches 5, 6, and 7; the relay 2 the switches 8, 9 and 10; the relay 3 the switches 11, 12 and 13; and the relay 4 the switches 14, 15 and 16. All of said switches have front contacts, so that when the respective relays are deenergized the switches drop away from their contacts to open the respective circuits. The solenoids A, B, C and D are connected in the respective circuits 17, 18, 19 and 20 with the respective switches 5, 8, 11 and 14.

The solenoid E is connected in a circuit 21 with the switches 6 and 12; the solenoid F is connected in a circuit 22 with the switches 10 and 13; the solenoid G is connected in a circuit 23 with the switches 9 and 15; and the solenoid H is connected in a circuit 24 with the switches 7 and 16. The circuits 17 to 24, inclusive, each include a battery or other source of electrical current as indicated by the plus and minus marks, as will be apparent, the connections with the battery or source of current being omitted for sake of clearness.

It will be apparent from the foregoing that when the relay 1 is energized this will close the switch 5 and circuit 17 to energize the circuit A. Similarly, when the relays 2, 3 and 4 are energized the respective solenoids B, C and D are energized. When relays 1 and 3 are energized they will close the switches 6 and 12 of the circuit 21 to energize the solenoid E. Similarly, the energization of relays 2 and 3 will close the switches 10 and 13 to energize solenoid F; energization of relays 2 and 4 will close switches 9 and 15 to energize solenoid G; and energization of relays 1 and 4 will close switches 7 and 16 to energize solenoid H.

The solenoids A, B, C and D are controlled by individual relays, while the solenoids E, F, G and H are each controlled by two of the relays, thus providing eight different controlling conditions, including a ninth with all of the solenoids deenergized.

The relays 1, 2, 3 and 4 are disposed in the respective circuits 25, 26, 27 and 28, each having a suitable source of electrical current, and said circuits are connected to the plates of the audion valves 29, 30, 31 and 32, respectively, which have the grid circuits 33, 34, 35 and 36, respectively including the respective receiving coils 37, 38, 39 and 40 which move in close proximity to the traffic rails 41 and 42 of the track.

The coils 37 and 38 move over the rail 41 and are wound reversely to one another, while the coils 39 and 40 move over the rail 42 and are also wound reversely to one another, so that the coils of each pair will reverse the polarity of the current in the corresponding grid circuits. Thus, the flow of current in the circuit 33 is reverse to that in the circuit 34, and the flow in the circuit 35 is reverse to that in the circuit 36.

Polarized pulsating direct current is used in the rails 41 and 42 to induce similar current in the grid circuits, for obtaining the various conditions of control.

Two trackside circuits are employed, each including one rail of the track, for inducing current in the receiving coils of the vehicle equipment. The rails have insulated joints to divide the track into blocks, and the trackside circuits of one block are shown in Fig. 1.

One circuit includes the wires 43 and 44 connected to the opposite ends of the rail 41 in the block, and connected at their adjacent ends to the reversing switches 45 and 46, respectively. The other circuit similarly includes wires 47 and 48 connected to the opposite ends of the rail 42 and to the reversing switches 49 and 50, respectively. The switches 45 and 46 have the contacts 51, 52 and 53, and the switches 49 and 50 have the contacts 54, 55 and 56. The contacts 51, 52, 54 and 55 are connected by a wire 57 with one terminal of a one-half wave rectifier 59 of any suitable kind, and the contacts 53 and 56 are connected by a wire 58 with the other terminal of said rectifier. The rectifier is connected to the secondary 60 of a transformer whose primary 61 is supplied with alternating current of suitable frequency and voltage.

When using alternating current any suitable bulb, chemical, mechanical or other rectifier may be employed so that the output of the rectifier is a pulsating direct current, and such current may also be furnished from a source of direct current by interrupting same with a suitable frequency. The element 59 may therefore represent any suitable source of pulsating direct current.

The switches 45 and 46 are part of a polarized relay J, and the switches 49 and 50 are likewise part of a polarized relay K. Said relays J and K may each be supplied with direct current in opposite directions, by means of manual, automatic or other control not forming part of this invention. When the relays are deenergized the switches are in neutral or intermediate position between the contacts. When current flows through the relay J in one direction the switches 45 and 46 are moved toward the left against the respective contacts 51 and 53, whereas when current flows through the relay in the opposite direction the switches are moved toward the right against the respective contacts 53 and 52. Similarly, when current flows through the relay K in one direction the switches 49 and 50 are moved toward the left against the respective contacts 54 and 56, whereas when the current flows through said relay in the opposite direction said switches are moved against the respective contacts 56 and 55.

In operation, assuming the relay J to be energized so as to move the switches 45 and 46 toward the left, as seen in Fig. 1, against the contacts 51 and 53, with the relay K deenergized, the rail 42 will be deenergized so that the coils 39 and 40 will not pick up energy from said rail 42, and the rail 41 will be energized by pulsating direct current flowing in one direction. The coils 37 and 38 will pick up the pulsating direct current, and the induced current flows in opposite directions in the circuits 33 and 34.

The valves 29 and 30 are alike, and are so constructed as to only permit of the excitation of said valves when the pulsating current flows in the proper direction, which under the conditions mentioned would excite the valve 29 but not the valve 30. The relay 1 is therefore energized to close the switches 5, 6 and 7, thereby energizing the solenoid A, while the other solenoids are all deenergized.

If the relay J is energized by current flowing in the opposite direction, with the switches 45 and 46 against the contacts 53 and 52, respectively, the flow of pulsating direct current will be reversed in the rail 41, so that the valve 30 is energized to energize the relay 2, while the valve 29 is not energized. Therefore, the solenoid B is energized by the closing of the switch 8, while the relays 1, 3 and 4 are deenergized.

In the same way, with the relay J in neutral position, the switches 49 and 50 being moved toward the left against the contacts 54 and 56 will energize the rail 42 with pulsating direct current flowing in one direction so that the valve 31 is energized to energize the relay 3 and solenoid C, whereas when the switches 49 and 50 are moved toward the right against the contacts 56 and 55, respectively, the flow of pulsating current in the rail 42 is reversed so that the valve 32 is energized to energize the relay 4 and solenoid D.

The receiving coils 37, 38, 39 and 40 may also be of special formation so that one coil of each pair will only pick up the pulsating current from the corresponding rail flowing in one direction, in order to assist the audion valves in selecting the desired polarity of pulsating current. The pulsating current flowing in either rail is polarized, and the relation of the receiving coils with the rails and the audion valves is such as to selectively excite the audion valves. Thus, when pulsating current of one polarity flows in the rail 41 it is induced through the coils 37 and 38 into the respective circuits 33 and 34. However, the flow of pulsating currents in said circuits is reverse with reference to the audion valves 29 and 30, the flow of current in one valve being from the grid to the filament and in the other valve from the filament to the grid, it being understood that the flow in one direction only being effective to excite either valve to increase the flow in the plate circuit. When the pulsating direct current flows in the opposite direction in the rail 41, the flow of pulsating direct currents in the circuits 33 and 34 is reversed accordingly, and the other valve, either 29 or 30, will be excited. The same is true of the valves 31 and 32 connected with the coils 39 and 40, in that flow of pulsating direct current in one direction in the rail 42 will excite one of said valves, while flow of current in the opposite direction will excite the other valve.

Both rails 41 and 42 may be simultaneously energized by the different positions of the relays J and K. For example, with the switches of relays J and K engaging their left hand contacts the relays 1 and 3 will be energized, and the solenoid E will therefore be energized because the switches 6 and 12 of its circuit are both closed. With the switches of relay J engaging their left hand contacts and the switches of relay K engaging their right hand contacts, the relays 2 and 3 are energized, thereby closing the switches 10 and 13 of the circuit 22 so as to energize the solenoid F. With the switches of both relays J and K engaging their right hand contacts, the relays 2 and 4 are energized, to close the switches 9 and 15 of the circuit 23 of the solenoid G. With the switches of relay J engaging their right hand contacts and the switches of relay K engaging their left hand contacts, the relays 1 and 4 are energized, to close the switches 7 and 16 of the circuit 24 of solenoid H.

Eight different conditions are thus obtained, not including the ninth condition with all relays deenergized, as follows:

J at left, K at neutral energizes 1 and A.
J at right, K at neutral energizes 2 and B.
J at neutral, K at right energizes 3 and C.
J at neutral, K at right energizes 4 and D.
J and K at left energizes 1, 3 and E.
J at left, K at right energizes 2, 3 and F.
J and K at right energizes 2, 4 and G.
J at right, K at left energizes 1, 4 and H.

The apparatus is not only useful for continuous control of a train or vehicle while moving within a block, but is also useful for intermittent control. Thus, the apparatus may be employed for resetting the vehicle equipment after or during a tripping operation obtained by any of the well known devices of the prior art when passing a control location. The tripping action will obtain danger conditions and the solenoids or translating devices A to H may be energized for eliminating danger conditions and establishing other conditions.

Fig. 2 illustrates a modified form of apparatus for three condition control, embodying solenoids or translating devices A and B. When the solenoid A is energized same will indicate or produce clear conditions in the vehicle equipment; when the solenoid B is energized with the solenoid A deenergized, same will indicate or produce caution conditions; whereas when both solenoids are deenergized same will indicate or produce danger conditions.

The solenoids A and B are controlled by Siamese twin relays 1 and 2 whose switches 5 and 8 are united so as to alternately engage their front contacts. The switch 5 is in a circuit 17 with the solenoid A, battery 62 or other source of electrical current, switch 63 and its front contact 64 connected to the switches 5 and 8. The switch 8 is in a circuit 18 with the solenoid B, battery 62, switch 63 and contact 64. The switch 63 is raised against its contact 64 when either of the relays 1 and 2 is energized, and the circuits 17 and 18 are alternately closed, both circuits being opened at the contact 64 when both relays are deenergized so as to release the switch 63.

The relays 1 and 2 are connected in the plate circuits 25 and 26, respectively, with the audion valves 29 and 30, and the grid circuits 33 and 34 of said valves include the receiving coils 37 and 38, respectively, which cooperate with the respective rails 41 and 42. As shown, the circuits 33 and 34 have crystal or other rectifiers or valves 65 to permit the pulsating current to flow in one direction in each circuit but not in the opposite direction, to assist the valves 29 and 30 in their polarized selection of current.

Electric lamps 66, 67 and 68 are provided for clear, caution and danger conditions, being preferably colored green, yellow and red, respectively. The lamps are connected to the battery 62 by the conductor 69. The lamp 66 is connected by a conductor 70 with the circuit 17 between the switch 5 and solenoid A, so that the lamp 66 is in parallel with the solenoid to be lighted when the solenoid is energized to control the air brakes, for clear conditions. The lamp 67 is connected by a conductor 72 with the circuit 18 between the switch 8 and solenoid B, so that said lamp is in parallel with the solenoid B to be lighted when said solenoid is energized for controlling the air brakes for caution conditions. The lamp 68 is connected by a conductor 73 with a back contact 74 for the switch 63, so that when the relays 1 and 2 are deenergized, the switch 63 moving against the contact 74, will close the circuit including the battery 62, conductor 69, lamp 68, conductor 73, contact 74 and switch 63, thereby lighting the lamp 68.

A single trackside circuit is employed, using both rails 41 and 42. A polarized relay 75 is provided that is suitably controlled by traffic in the blocks ahead, and wires 43 and 44 are connected to the rails 41 and 42, respectively, at the exit end of the block. The wires 43 and 44 are connected through a reversing switch device with one-half wave rectifier 59 which is connected to the secondary 60 of a transformer having the primary 61 supplied with suitable alternating current. The wire 43 is connected with a contact 53, and the wire 44 is connected with contacts 51 and 52, with which the reversing switches 45 and 46 cooperate, and said switches are connected with the front contacts 76 and 77 of switches 78 and 79 which are connected with the rectifier 59. The switches 45, 46, 78 and 79 are part of the relay 75, the switches 78 and 79 being moved against their front contacts when the relay is energized, and the switches 45 and 46 being moved to reversed positions when the relay is energized by current flowing in respectively opposite directions therethrough.

For clear conditions, as seen in Fig. 2, with current flowing through the relay 75 in one direction, the switches 45 and 46 are moved toward the left against the contacts 51 and 53, respectively, thereby connecting the rectifier 59 or source of pulsating direct current with the rails 41 and 42 so that the waves flow in the direction of the arrows, as seen in Fig. 2 the trucks of the train or vehicle bridging the rails 41 and 42 to complete the circuit. The pulsating direct current is induced in the coils 37 and 38, and will energize the valve 29 but not the valve 30, so that the relay 1 is energized to move the switch 5 against its front contact, thereby closing the circuit of the solenoid A and lamp 66.

When current flows through the relay 73 in the opposite direction, the switches 45 and 46 will be moved toward the right against the contacts 53 and 52, respectively, and the pulsating current will flow in the opposite direction in the rails 41 and 42, thereby energizing the valve 30 but not the valve 29, so that the relay 2 is energized to move the switch 8 against its front contact, thereby opening the switch 5. The solenoid B and lamp 67 are therefore energized for caution conditions.

When the relay 75 is deenergized, the switches 45 and 46 move to neutral position, and the switches 78 and 79 are released, so as to open the trackside circuit, and both relays 1 and 2 and solenoids A and B will be deenergized. The switch 63 is therefore released and will close the circuit of the danger lamp 68.

There are various types of rectifiers and other devices which may be used for selecting the particular polarized pulsating current desired, including piezo-electric crystals, and what are known as twin magneto-striction oscillators.

Having thus described the invention, what is claimed as new is:—

1. The method of transmitting control from a track to a passing vehicle, consisting in impressing pulsating direct current selectively in opposite directions in either of two trackside circuits in a block of the track, inducing said current from either of the trackside circuits in one of a plurality of vehicle carried circuits, and selecting the polarized currents flowing in the vehicle carried circuits for obtaining at least four conditions of vehicle control.

2. The method of transmitting control from a track to a passing vehicle, consisting in impressing pulsating direct current selectively in opposite directions in either of two trackside circuits in a block of the track, inducing said current from either trackside circuit in a vehicle carried equipment, and selecting the currents flowing in opposite directions in the vehicle carried equipment to obtain at least four different vehicle controlling conditions.

3. Vehicle control apparatus comprising two trackside circuits in a block of the track, means for impressing pulsating direct current selectively in opposite directions in either trackside circuit, two vehicle carried circuits each having a receiver adapted to cooperate inductively with one trackside circuit, two translating devices, and an electrical connection between each of said devices and one vehicle carried circuit including a valve to control said translating device by the flow of pulsating direct current in one direction only.

4. Vehicle control apparatus comprising two trackside circuits in a block of the track, means for impressing pulsating direct current selectively in opposite directions in each trackside circuit, two vehicle carried receiving coils inductively cooperable smultaneously with the trackside circuits, a vehicle carried translating device for each coil, and an electrical connection between each translating device and corresponding coil including means for affecting the control of said device by the coil in the flow of pulsating direct current in one direction only.

5. Vehicle control apparatus comprising two trackside circuits in a block of the track, means for impressing pulsating direct current selectively in opposite directions in each trackside circuit, vehicle carried receiving means adapted to coperate inductively simultaneously with said circuits, translating devices carried by the vehicle, and electrical connections between said devices and receiving means and including means for selectively affecting said translating devices by the flow of pulsating direct current in opposite directions in said receiving means from the two trackside circuits.

6. Vehicle control aparatus comprising a plurality of trackside circuits in a block of the track, means for impressing pulsating direct current selectively in opposite directions in each of said circuits, vehicle carried receiving coils cooperable inductively simultaneously with said trackside circuits, vehicle carried relays, electrical connections between said relays and coils and including valves for the selective control of said relays from said coils by pulsating direct current flowing in opposite directions, vehicle carried translating devices controlled by the individual relays, and other vehicle translating devices controlled by a plurality of the relays.

7. Vehicle control apparatus comprising a plurality of trackside circuits in a block of the track, means for impressing pulsating direct current selectively in opposite directions in each of said circuits, vehicle-carried receiving coils cooperable inductively simultaneously with said circuits, more than two relays on the vehicle, electrical connections between said relays and the coils and including valves for the selective control of said relays from said coils by the polarized pulsating direct current, a larger number of translating devices than said relays, means for controlling some of the translating devices by the individual relays, and means for controlling the other translating devices by combinations of said relays.

8. The method of transmitting control from a track to a passing vehicle, consisting in impressing pulsating direct current selectively in opposite directions in either of the two rails of the track, inducing the current from either rail in a vehicle carried equipment, and selecting the currents flowing in opposite directions in the vehicle carried equipment to obtain at least four different vehicle controlling conditions.

9. Vehicle controlling apparatus comprising two trackside circuits including the rails of the track, means for impressing pulsating direct current selectively in opposite directions in either trackside circuit, vehicle carried means adapted to cooperate inductively simultaneously with said rails, translating devices carried by the vehicle, and electrical connections between said devices and receiving means and including means for selectively affecting said translating devices by the flow of pulsating direct current in opposite directions in said receiving means from the two rails.

10. The method of transmitting control from a track to a moving vehicle thereon, consisting in impressing different fluctuating electrical currents selectively in either of two trackside elements, inducing the current from each trackside element in a vehcile equipment, controlling translating means by different currents in one trackside element, controlling other translating means by different currents in the other trackside element, and controlling still other translating means by currents in both trackside elements.

11. The method of transmitting control from a track to a moving vehicle thereon consisting in impressing different electrical currents selectively in either of the two rails of the track, inducing the current from each rail in a vehicle equipment, controlling translating means by different currents in one rail, controlling other translating means by different currents in the other rail, and controlling still other translating means by currents in both rails.

12. The method of transmitting control from a track to a passing vehicle, consisting in subjecting an alternating electric current to half wave rectification, transmitting the rectified current selectively in opposite directions to either of the two rails of the track, inducing the current from each rail in a vehicle carried equipment, and controlling at least four different translating devices from said equipment by the different currents in said rails.

13. Vehicle control apparatus comprising two trackside elements, means for impressing different fluctuating electrical currents selectively in either of said elements, vehicle carried equipment having receiving means cooperable inductively with said elements, translating means controlled by said equipment by different currents in one trackside element, translating means controlled by said equipment by different currents in the other trackside element, and translating means controlled by said equipment by currents in both trackside elements.

14. Vehicle control apparatus comprising two trackside circuits each including one rail of the track, means for impressing different electrical currents selectively in either trackside circuit, vehicle carried receiving means cooperable inductively with said rails, translating means controlled from said receiving means by different currents in one rail, translating means controlled from said receiving means by different currents in the other rail, and translating means controlled from said receiving means by currents in both rails.

15. Vehicle control apparatus comprising two trackside circuits each including one rail of the track, a source of alternating electrical current, a half wave rectifier supplied from said source, means for connecting said rectifier reversely selectively in each trackside circuit, vehicle carried equipment having receiving means cooperable inductively with said rails, at least four translating devices, and connections between said equipment and devices for selectively controlling said devices by different currents in the trackside circuits.

In testimony whereof I hereunto affix my signature.

DANIEL HERBERT SCHWEYER.